United States Patent [19]

Fitzpatrick

[11] Patent Number: 4,701,019

[45] Date of Patent: Oct. 20, 1987

[54] SELECTIVE APPLICATION OF LIGHT-ABSORBING PARTICLES TO A LENTICULAR SCREEN

[75] Inventor: Brian J. Fitzpatrick, Ossining, N.Y.

[73] Assignee: North American Philips Corporation, New York, N.Y.

[21] Appl. No.: 938,669

[22] Filed: Dec. 5, 1986

[51] Int. Cl.4 .......................... G03B 21/60; B05D 5/06
[52] U.S. Cl. ..................................... 350/127; 350/128; 427/45.1; 427/163; 427/180; 427/356
[58] Field of Search ....................... 427/45.1, 163, 180, 427/356; 350/127–129

[56] References Cited

U.S. PATENT DOCUMENTS

| | | | |
|---|---|---|---|
| 4,468,092 | 8/1984 | Inoue et al. | 350/128 |
| 4,573,764 | 3/1986 | Bradley | 350/128 |
| 4,660,930 | 4/1987 | van der Hoorn et al. | 350/128 X |

Primary Examiner—Richard A. Wintercorn
Attorney, Agent, or Firm—Robert J. Kraus

[57] ABSTRACT

Light-absorbing particles are selectively applied to a lenticular light-transmissive screen, such as a projection television screen. The particles are selectively deposited in grooves between lenticules of the screen by filling the grooves to a predetermined depth with a slurry comprising a mixture of a volatile liquid and the light-absorbing particles. Microwave radiation is applied to the screen with the deposited particles, to effect evaporation of any unevaporated liquid and fusing of the particles to each other and to the screen.

9 Claims, 3 Drawing Figures

SELECTIVE APPLICATION OF LIGHT-ABSORBING PARTICLES TO A LENTICULAR SCREEN

CROSS REFERENCE TO RELATED APPLICATIONS

This application is filed concurrently with applications LPHA 21,357 and LPHA 21,358 of the same inventor, which are hereby incorporated by reference.

BACKGROUND OF THE INVENTION

1. Field of the Invention

The invention relates to light-transmissive viewing screens, and in particular to lenticular screens having light-absorbing material disposed in grooves between the lenticules of the screen.

2. Description of the Prior Art

Light-transmissive viewing screens such as rear projection screens are commonly provided with integral lenticules or lens elements. These lens elements are shaped to collect image-forming light rays projected onto the rear side of the screen by one or more projection tubes, and to concentrate the rays to form a bright image at the peaks of lens elements on the front or viewing side of the screen.

It is well known that providing a coating of masking material in grooves between the light-emitting lens elements, to absorb ambient light, enhances image contrast. Examples of lenticular screens with such masking material are described in commonly-owned U.S. Pat. No. 4,605,283 to Douglas A. Stanton, which is hereby incorporated by reference. The Stanton patent recognizes the desirability of minimizing contact of the masking material with the screen surfaces defining the grooves. The masking material not only absorbs ambient light incident to the masked grooves at the viewing side of the screen, but also partially absorbs the image-forming light entering the lens elements from the rear of the screen, thereby attenuating the image-forming light eventually reaching the light-emitting peaks of the lens elements. This attenuation occurs wherever the masking material contacts the surface of a lens element, thereby locally increasing the critical angle for total internal reflection (TIR) of light rays striking the rear of the lens elements. As is explained in the Stanton patent, this increase of the critical angle decreases the range of angles from which image-forming light rays received at the rear of the screen will be totally reflected toward the light-emitting peaks of the respective lens elements. To minimize the total area of each lens element contacted by the masking material, thus minimizing the total surface area of the screen for which the TIR is reduced, the Stanton patent proposes that the masking material be provided in the form of a multiplicity of small light-absorbing particles. Each particle makes minimal contact (e.g. point contact) with the outer surface of the lens element against which it is disposed, and the particles are contained within each groove by a layer extending between respective sidewalls of the lens elements which define the groove.

Selective deposition of the light-absorbing masking particles into the grooves of a lenticular screen such as that disclosed in the Stanton patent can be achieved by reasonably simple methods. Any particles which land on the rounded peaks of the disclosed lens elements can be wiped or jarred off and tend to drop into the grooves. However, selective deposition is more difficult with screens having peaks with concave central portions, such as are described in U.S. Pat. No. 4,573,764 to Ralph H. Bradley, which is hereby incorporated by reference. With such screens it has been found difficult to keep the deposited particles out of the concave portions of the peaks. It has also been found difficult to achieve uniform filling of the grooves with the particles. Both of these objectives must be achieved in order to ensure high brightness and high contrast of images formed on the screen.

Another problem experienced is associated with retaining the particles in the grooves without damaging the screen. In the Stanton screen masking arrangement, the layer containing the particles in each groove is preferably formed by heating the face of the screen until the uppermost particles in each groove fuse together. There is only a small margin of error between applying sufficient heat energy to fuse the uppermost particles into a layer and overheating the screen material (typically a plastic material such as polymethyl methacrylate) and causing optical distortion of the lenticules.

SUMMARY OF THE INVENTION

It is an object of the invention to provide a lenticular, light-transmissive screen having a multiplicity of light-absorbing particles securely affixed in grooves between the lenticules of the screen, with minimum contact to the screen.

It is another object of the invention to provide a simple but effective method for selectively applying light-absorbing masking particles to the grooves of a light-transmissive, lenticular screen.

It is a further object of the invention to provide such a method which both minimizes the deposition of the particles on the light-emitting peaks and which effects uniform coating of the groove areas to be masked.

It is yet another object of the invention to securely affix the particles to the screen while both minimizing contact of the particles with the screen and preventing excessive heating of the screen.

In accordance with the invention, these and other objects are achieved by filling the grooves to a predetermined depth with particles having a substantially higher microwave absorption coefficient than the screen material and having heat-fusible outer surfaces. The particles are then affixed in the grooves without overheating the screen by transfusing the screen and the particles with microwave radiation of sufficient energy to fuse the particles to each other and to points of contact with the lenticule sidewalls. Because of its substantially lower absorption coefficient, the screen is not heated sufficiently to cause any distortion.

In a preferred embodiment of the invention, the particles are selectively provided in the grooves by applying a slurry comprising a mixture of a volatile liquid and the light-absorbing particles. The surface of the screen is wiped to effect uniform filling of the grooves while removing slurry from the peaks of the lenticules. This is more easily achieved than wiping off bare particles, because the wetted particles have less friction and tend to flow across the screen in front of the wiping implement carrying away particles which are on or near the peaks, even if the peaks are concave. After wiping, the volatile liquid quickly evaporates, leaving only the particles. Any particles which remain on the peaks after the application of microwave radiation can be readily removed by another wiping step, because they tend to be isolated and because they tend to fuse to the screen over only relatively small areas of contact. Conversely, each particle in a groove is generally secured by several points of contact with other particles and, if adjacent thereto, by a point of contact with the screen.

BRIEF DESCRIPTION OF THE DRAWING

The invention will now be described with reference to exemplary drawing figures, of which.

DESCRIPTION OF THE PREFERRED EMBODIMENT

Figure 1:
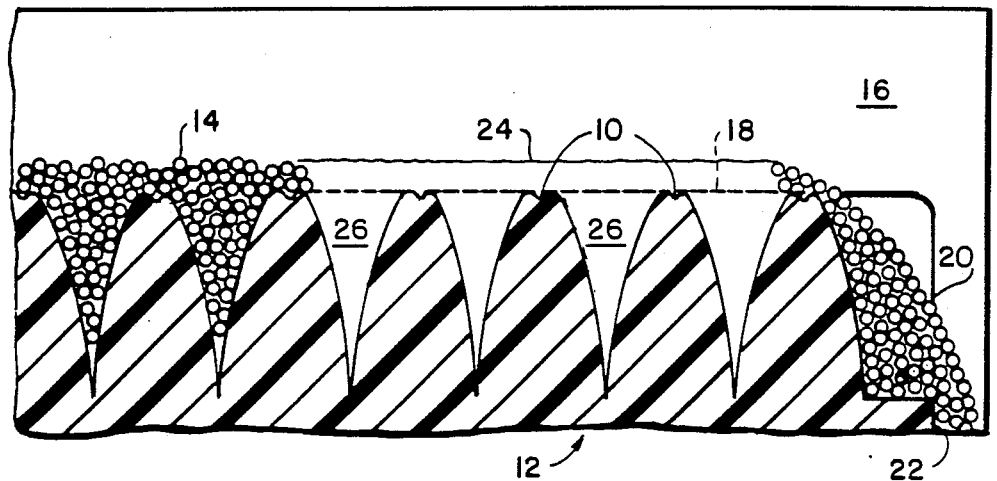
FIG. 1 illustrates the spreading of a slurry containing light-absorbing particles across the surface of a lenticular screen, shown in cross-section.

FIG. 1 illustrates a preferred method for filing the grooves between lenticule peaks 10 of a screen 12 with a viscous slurry 14 containing light-absorbing particles. In accordance with this method, the viscous slurry is deposited at one end of the screen, and is spread across the screen by a doctor blade 16 having inner edges configured to contact the peaks of the lenticules and the screen edges on opposite sides of the screen. In this figure, only the right-hand portion of the screen 12 (shown in cross-section) and the right-hand portion of the doctor blade 16 are shown. Horizontal edge 18 of the blade contacts the lenticule peaks, and right-hand vertical edge 20 of the blade contacts the right-hand edge 22 of the screen. Preferably, at least the horizontal edge 18 of the blade is made from a material such as a plastic which will not scratch the lenticule peaks of the screen.

Figure 2:
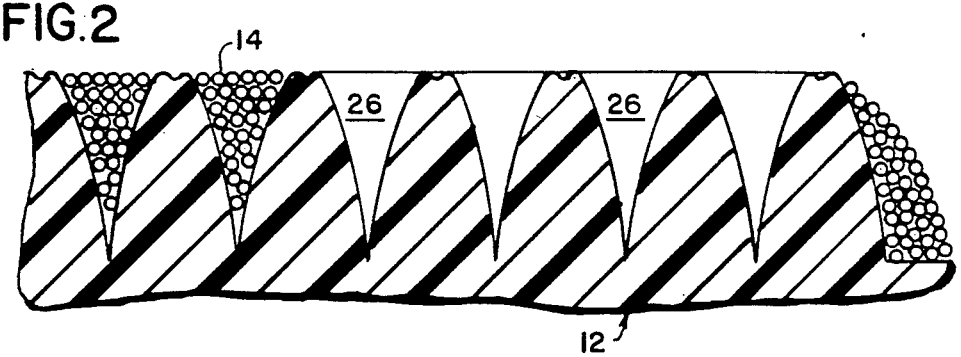
FIG. 2 illustrates the screen with the slurry deposited in the grooves between the lenticules.

The manner in which the slurry is spread across the screen to fill the grooves can best be understood by referring to FIGS. 1 and 2 together, which respectively depict the operation of the doctor blade 16 and the resulting coverage of the screen with the slurry 14. At the instant depicted by FIG. 1, the doctor blade 16 is moving toward the viewer and approaching the near end of the screen 12. The level 24 of the slurry pushed along in front of the blade has fallen substantially from its initial level, when it was deposited at the far end of the screen. The blade serves to both evenly fill the grooves 26 of the screen and to wipe the peaks so that substantially none of the particles in the slurry remain on the peaks. The horizontal blade edge 18 may be straight, as shown, or may be contoured to match the lenticule peaks which, in the exemplary screen disclosed, have longitudinally-extending, concave indentations. Such contouring will reduce the likelihood that light-absorbing particles will remain on the peaks after the blade has passed by, but is generally not necessary in view of the tendency of most particles in the indentations to flow along in front of the blade.

The blade edge 18 may also be contoured to protrude slightly into each groove 26, to establish a predetermined depth of the slurry in the grooves. This depth will be determined by the desired depth of the light-absorbing masking particles in the grooves, which in turn is determined by the optical design criteria for each particular screen.

The slurry itself is produced by mixing light-absorbing particles with a volatile liquid in proportions which produce the desired viscosity. The viscosity should be sufficiently high to prevent the slurry from draining out of the grooves and to minimize the amount of volatile liquid which must be evaporated, but it should be sufficiently low to ensure wetting of the particles, thereby minimizing their frictional contact with the screen surface. Volatile liquids which are especially suitable are alcohols, and in particular isopropyl alcohol.

With respect to the light-absorbing particles used in the slurry, a wide range of suitable sizes and compositions is available, as is described in the above-mentioned U.S. Pat. No. 4,605,283 to Stanton. Especially suitable for slurry deposition into the grooves of a typical lenticular screen having peak-to-peak spacing of approximately 300 microns and having concave indentations in the lenticule peaks with a radius of curvature of approximately 50 microns are relatively-large particles, such as 75 micron diameter particles available from 3M Company of St. Paul, Minn. under part no. 50814-55. These particles have the requisite high light absorbency, high microwave absorption coefficient, and surface fusibility when the particles are heated by exposure to microwave radiation. Their diameter is also sufficient to facilitate removal from the lenticule peaks by the horizontal blade edge 18 and to minimize the number of places where they contact the sidewalls of the lenticules.

Figure 3:
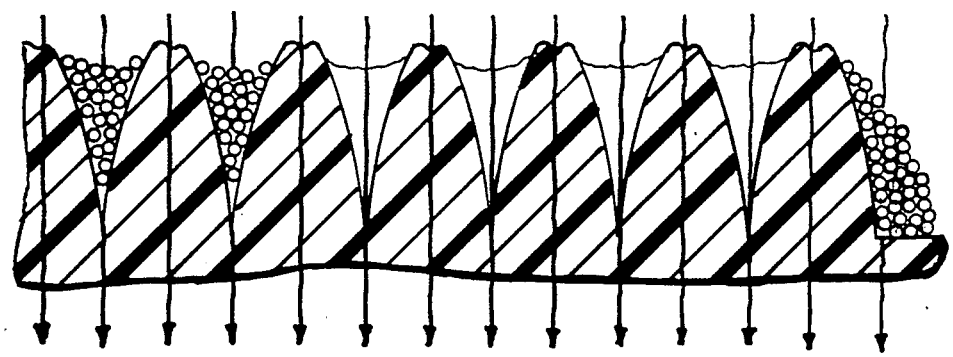
FIG. 3 illustrates heating of the slurry in the grooves by microwave radiation.

After deposition of the particles in the grooves, the screen is moved to an affixing station as is illustrated in FIG. 3. At this station, the screen and the particles in the grooves are transfused with microwave radiation of sufficient energy to fuse the particles to each other and to the screen, without optically distorting the lenticules. The energy expended will depend on the size of the screen, the particle diameters, the amount of non-evaporated liquid remaining in the slurry, and the relative arrangement of the microwave source and the screen.

During this step, the particles will tend to settle in their respective grooves as the liquid in the slurry evaporates, and the initial level of the slurry left in the grooves must be high enough to compensate for such settling, to achieve the desired depth of the particles affixed in the grooves. After completion of this microwave heating step, the lenticule peaks may once again be wiped by a blade to remove any particles remaining on the peaks.

In a test of the microwave heating step, conducted before discovery and testing of the slurry deposition technique, particles were deposited in the grooves of a 4.0 centimeter by 3.7 centimeter screen by simply dropping the particles onto the screen and wiping off any particles landing on the peaks, as is disclosed in the Stanton patent. Particles had a diameter of about 75 microns and were obtained from 3M Company under part no. 50814-55. The deposited particles were optimally heated to fusion in a NORELCO Model 7100 microwave oven which was operated at 650 watts of microwave output power for four minutes. When heated for less than three minutes there was insufficient fusion of the particles to securely affix them in the grooves. When heated for over four minutes the particles tended to lose their spherical shape and made contact with substantial areas of the lenticule sidewalls, thereby adversely affecting TIR.

Although the invention has been described with reference to a particular embodiment, numerous variations can be made without departing from the scope of the invention, as is set forth in the appended claims. For example, other types of particles which have a substantially higher microwave absorption coefficient than the screen material could be used. Examples are plastic-coated metal particles, plastic-coated metal-cored particles other than toner particles, and black-dyed polyvinyl-chloride plastic particles. Polyvinyl-chloride, unlike many other plastics, readily absorbs microwave radiation. Also, a much less viscous slurry may be utilized by, for example, containing the screen in a walled enclosure having a height approximately equal to the height of the lenticule peaks. Such a low-viscosity slurry might be useful in situations where particles otherwise tend to stick to the lenticule peaks of a screen.

I claim:

1. In a light-transmissive screen having a surface contoured to include a multiplicity of raised lenticules having respective peaks and sidewalls, said sidewalls defining grooves between the lenticules, the improvement comprising a multiplicity of light-absorbing particles filling each groove to a predefined depth, said particles having a substantially higher microwave absorption coefficient than the screen material, and having heat-fusible outer surfaces which are microwave-fused to each other and to the screen, thereby affixing the particles in the grooves.

2. A light-transmissive screen as in claim 1 where the particles consist essentially of an inner material having a high microwave absorption coefficient, surrounded by an outer, heat-fusible, light-absorbing material.

3. A screen as in claim 1 or 2 where the particles have a nominal diameter of approximately 75 microns.

4. A method for selectively applying light-absorbing particles to a light-transmissive screen having a surface contoured to include a multiplicity of raised lenticules having respective peaks and sidewalls, said sidewalls defining grooves between the lenticules, said method comprising the steps of:

(a) filling the grooves to a predetermined depth with a slurry comprising a mixture of a volatile liquid and light-absorbing particles having a substantially higher microwave absorption coefficient than the screen material and having heat-fusible outer surfaces; and (b) transfusing the screen and the particles in the grooves with microwave radiation of sufficient energy to fuse the particles to each other and to the screen, but of insufficient energy to optically distort the screen.

5. A method as in claim 4 where the grooves are filled to a predetermined depth with the slurry by covering the entire screen surface with the slurry and then wiping the slurry from at least the peaks of the lenticules.

6. A method for selectively applying light-absorbing particles to a light-transmissive screen having a surface contoured to include a multiplicity of raised lenticules having respective peaks and sidewalls, said sidewalls defining grooves between the lenticules, said method comprising the steps of:

(a) depositing at an end of the screen a slurry comprising a mixture of a volatile liquid and light-absorbing particles having a substantially higher microwave absorption coefficient than the screen material and having heat-fusible outer surfaces;

(b) spreading the slurry across the screen by means of a wiping member which is shaped to effect removal of the slurry from at least the peaks of the lenticules; and (c) transfusing the screen and the particles in the grooves with microwave radiation of sufficient energy to fuse the particles to each other and to the screen, but of insufficient energy to optically distort the screen.

7. A method as in claim 4, 5, or 6 where the microwave radiation effects evaporation of the liquid portion of the slurry.

8. A method as in claim 4, 5 or 6 where the volatile liquid consists essentially of an alcohol.

9. A method as in claim 8 where the volatile liquid consists essentially of isopropyl alcohol.

* * * * *